UNITED STATES PATENT OFFICE.

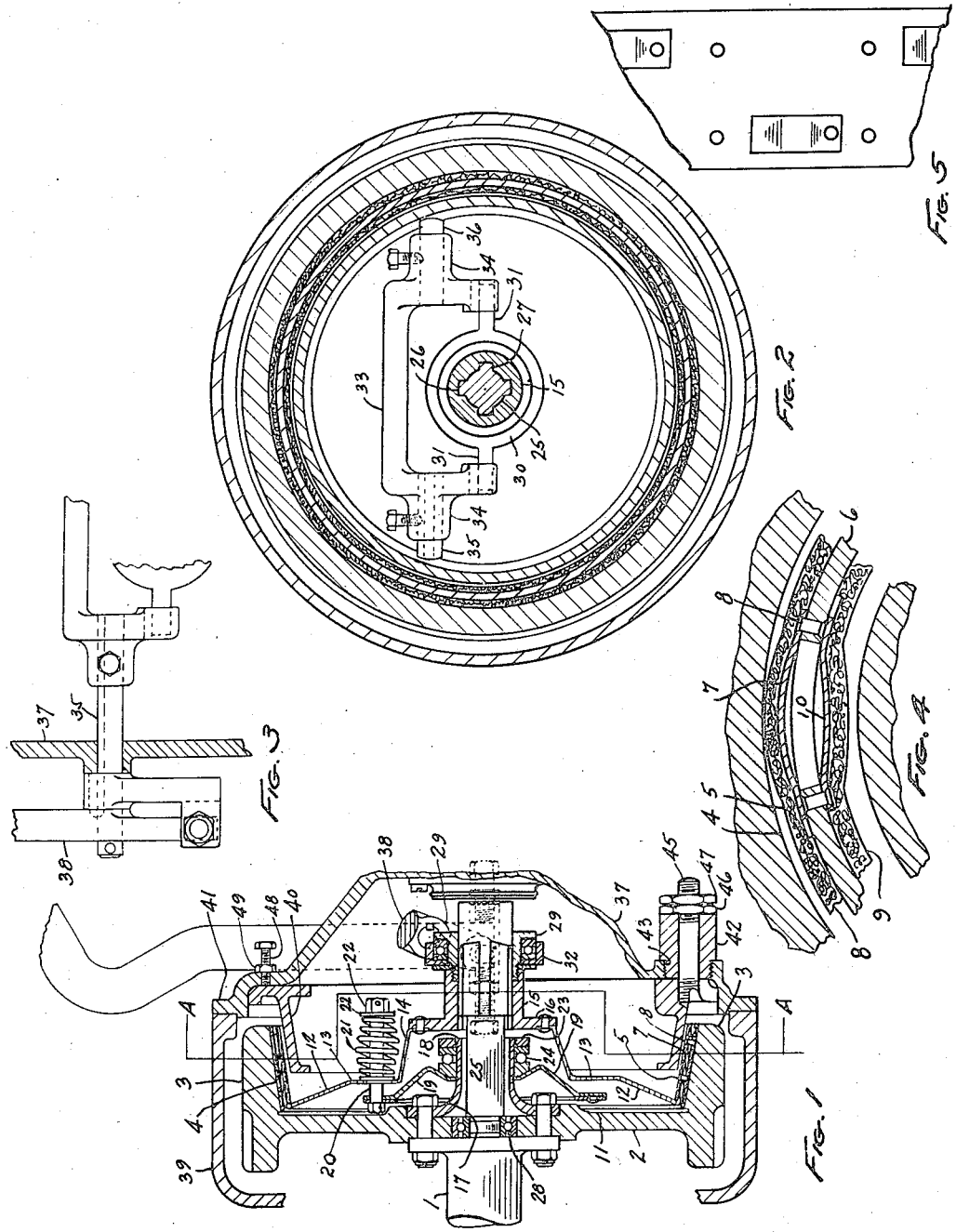

ALPHONSE JOSEPH LAVOIE, OF MONTREAL, QUEBEC, CANADA.

CLUTCH AND BRAKE MECHANISM.

1,395,841.	Specification of Letters Patent.	Patented Nov. 1, 1921.

Application filed November 29, 1919. Serial No. 341,537.

*To all whom it may concern:*

Be it known that I, ALPHONSE JOSEPH LAVOIE, a subject of the King of Great Britain, and residing at 294 Wilson avenue, in the city and district of Montreal, in the Province of Quebec, in the Dominion of Canada, have invented a new and useful Clutch and Brake Mechanism, of which the following is the specification.

The invention relates to clutch and brake mechanism as described in the present specification and illustrated in the accompanying drawings that form part of the same.

The invention consists in the novel means employed, whereby the brake is applied and released in coaction with the operation of the clutch.

The objects of the invention are to intimately associate the operation of the clutch and the brake, so that the attendant can give undivided attention to the one lever and thus avoid confusion and the danger resulting therefrom; to apply the brake with precision, firmness and without shock; to add to the comfort and safety in traveling by motor car; and generally to provide an effective mechanism free from complications, comparatively economical and specifically pointing out a modified construction than that described in my application, Serial Number 317,627, in regard to production.

In the drawings, Figure 1 is a longitudinal sectional view of the mechanism.

Fig. 2 is a cross sectional view on the line A—A in Fig. 1.

Fig. 3 is a fragmentary detail of the operating yoke and pivots.

Fig. 4 is a sectional detail of the gripping member.

Fig. 5 is a fragmentary plan view showing a detail of the gripping face.

Like numerals of reference indicate corresponding parts in each figure.

Referring to the drawings, the crank shaft 1 is shown as fixedly secured to the fly wheel 2, which is formed with the rim 3 and the annular inner friction surface 4 inclined from the inner end in an outward direction.

The friction lining 5 engages the surface 4 and is mounted on the clutch and brake member and at staggered intervals is raised from the surface of that member by the plates 7 secured by the rivets 8 in order to relieve the strain of a sudden grip in clutch movements. On the other side of the clutch member 6 the friction lining 9 is mounted and raised at intervals by the plates 10 secured by the same rivets 8.

The clutch member 6 is a projecting ring section from a raised plate covering the outer face 11 of the fly wheel and extending from the angle of the rim 3 and face 11 in an inclined annular section 12 to the straight section 13 and having a sleeve extension 14 secured to the operating sleeve 15 and more particularly to the flange 16. The collar 17 projects from the fly wheel 2 and is threaded at its outer end 18 adjacent to the sleeve 15 and the inner raised plate 19, encircles this collar 17 and supports, adjacent to its outer edge, the posts 20 for the springs 21, the latter encircling said posts between the heads 22 and the outer raised plate and particularly on the straight section 13. The inner raised plate 19 is held securely in position on the collar 17 by the nut 23 and thrust bearing 24.

It will be seen that the springs 21 continuously press on the outer raised plate and in doing this they exert a constant inward pressure on the clutch member 6. This clutch member 6 engages the surface 4 on the inside of the rim, therefore the said outer raised plate turns with the fly wheel 2, so long as the engagement of the clutch member therewith is maintained.

The driven shaft 25 is formed with keys 26 engaging corresponding keyways 27 in the sleeve 15 and extends through the collar 17 into the ball bearings 28 within the hub of the fly wheel 2.

The grooved collar 29 is screw-threaded into the sleeve 15 at the outer end and the ring 30 having the pivot pin extensions 31 is mounted in the groove of said collar 29 with ball bearings 32 for said collar to turn on.

The yoke 33 is mounted on the pivot pin extensions 31 and is formed with the shaft sockets 34, from which the shafts 35 and 36 extend into and through suitable bearings in the casing cover 37, the shaft 35 being engaged by the operating lever 38.

The casing cover 37 is secured to the casing 39 and closes in the brake member 40 in the form of a ring having the flange 41 abutting the cover 37 and bosses 42 to the inside of the threaded nut holes 43 in the cover 37. The nuts 44 are screwed into the holes 43 and the brake member 40 is adjusted by the bolt 45 and lock nuts 46 and 47. The set screws 48 with lock nut 49 are screw-threaded into the casing cover 37 and therethrough against the flange 41 and coöperate with the bolt fastenings 45 in adjusting the position of the brake member in relation to the friction lining 9 on the outer surface of the clutch member 6.

In the operation of this invention, the same thing occurs as in the operation of my invention described in my application for a patent, Serial Number 317,627 with the difference that the inside of the fly wheel rim is engaged for clutch purposes, therefore, a very considerable change in the structural features is necessary to account for the change.

The drawing of the operating sleeve along the driven shaft releases the clutch member from engagement with the fly wheel and as the sleeve is drawn further the other side of the clutch member is brought into engagement with the brake member and this retards the rotation of the driven shaft and leaves the crank shaft and fly wheel free from the load, so that it is only the momentum of the driven member, which has to be taken care of, and the speed of this member is slowed down gradually, in fact it may be said delicately because the manual operation is carried out following and in continuity with the release of the fly wheel, consequently there can be no jar or shock to the engine through confusion of levers and the engine must be released before the brake is applied.

Various changes may be made in the details of the construction without departing from the spirit of the invention, and so long as these changes are within the scope of the claims for novelty following, the protection accorded shall not be invalidated.

What I claim is:—

1. In a clutch and brake mechanism, a driving shaft, a wheel mounted thereon having a projecting rim, a driven shaft, a brake member in proximity to the inner surface of said projecting rim and rigidly and adjustably secured, an operating sleeve keyed to said driven shaft, a clutch member spring-held to engagement with the inner surface of said rim, and a lever operatively connected with said sleeve for releasing said clutch member and applying it to said brake member.

2. In a clutch and brake mechanism, a driving shaft, a wheel mounted thereon having a projecting rim, a driven shaft, a brake member in proximity to the inner surface of said projecting rim and rigidly and adjustably secured, an operating sleeve keyed to said driven shaft, a clutch member spring-held to engagement with the inner surface of said rim, an outer raised plate secured to said sleeve and terminating in said clutch member, and a lever operatively connected with said sleeve for releasing said clutch member and applying it to said brake member.

3. In a clutch and brake mechanism, a driving shaft, a wheel mounted thereon having a projecting rim, a driven shaft, a brake member in proximity to the inner surface of said projecting rim and rigidly and adjustably secured, an operating sleeve keyed to said driven shaft, a clutch member spring-held to engagement with the inner surface of said rim, an outer raised plate having an annular outwardly extending section secured to said sleeve, an intermediate vertical annular section and an inclined section terminating in said clutch member, and a lever operatively connected with said sleeve for releasing said clutch member and applying it to said brake member.

4. In a clutch and brake mechanism, a driving shaft, a wheel mounted thereon having a projecting rim, a driven shaft, a brake member in proximity to the inner surface of said projecting rim and rigidly and adjustably secured, an operating sleeve keyed to said driven shaft, a clutch member spring-held to engagement with the inner surface of said rim, a collar rigid with said wheel and surrounding said driven shaft, a thrust bearing on said collar, a retaining nut, an inner raised plate encircling said collar and engaging said thrust bearing, posts supported near the outer edge of said inner raised plate, an outer raised plate through which said posts extend, springs encircling said posts between the heads thereof and said outer plate and forming the means of holding said clutch member to its engagement, and a lever operatively connected with said sleeve for releasing said clutch member and applying it to said brake member.

5. In a clutch and brake mechanism, a driving shaft, a wheel mounted thereon having a projecting rim, a driven shaft, having a key portion and journaled in the hub of said wheel, a brake member in proximity to the inner surface of said projecting rim and rigidly and adjustably secured, an operating sleeve keyed to said driven shaft, a clutch member spring-held to engagement with the inner surface of said rim, and a lever operatively connected with said sleeve for releasing said clutch member and applying it to said brake member.

6. In a clutch and brake mechanism, a driving shaft, a wheel mounted thereon having a projecting rim, a driven shaft, a brake member in proximity to the inner surface of said projecting rim and rigidly and adjustably secured, a casing, a casing cover secured to said casing and adjustably supporting said brake member, an operating sleeve keyed to said driven shaft, a clutch member spring-held to engagement with the inner surface of said rim, and a lever operatively connected with said sleeve for releasing said clutch member and applying it to said brake member.

7. In a clutch and brake mechanism, a driving shaft, a wheel mounted thereon having a projecting rim, a driven shaft, a brake member in proximity to the inner surface of said projecting rim and rigidly and adjustably secured, a casing, a casing cover having screw plug holes, plugs in said holes, bolts through said plugs into said brake member and having lock nuts on the outer ends, adjusting set screws, an operating sleeve keyed to said driven shaft, a clutch member spring-held to engagement with the inner surface of said rim, and a lever operatively connected with said sleeve for releasing said clutch member and applying it to said brake member.

8. In a clutch and brake mechanism, a driving shaft, a wheel mounted thereon having a projecting rim, a driven shaft, a brake member in proximity to the inner surface of said projecting rim and rigidly and adjustably secured, an operating sleeve keyed to said driven shaft, and having an annular flange at its inner end and ring grooved section screw-threaded thereinto at the other end, a pivotally supported ring in said groove, a yoke forming the pivot support of said ring, a lever shaft suitably journaled and secured to said yoke, a clutch member spring-held to engagement with the inner surface of said rim, and a lever operatively connected with said sleeve for releasing said clutch member and applying it to said brake member.

9. In a clutch and brake mechanism, a driving shaft, a wheel mounted thereon having a projecting rim, a driven shaft, a brake member in proximity to the inner surface of said projecting rim and rigidly and adjustably secured, an operating sleeve keyed to said driven shaft, a clutch member spring-held to engagement with the inner surface of said rim, and having a friction surface lining on both sides, one in proximity to said wheel and the other in proximity to said brake member, each lining having a raised spring plate thereunder at intervals, and a lever operatively connected with said sleeve for releasing said clutch member and applying it to said brake member.

Signed at the city of Montreal, Province of Quebec, Dominion of Canada, this fourteenth day of November, 1919.

ALPHONSE JOSEPH LAVOIE.